United States Patent [19]

Lee et al.

[11] 4,353,963

[45] Oct. 12, 1982

[54] PROCESS FOR CEMENTING DIAMOND TO SILICON-SILICON CARBIDE COMPOSITE AND ARTICLE PRODUCED THEREBY

[75] Inventors: Minyoung Lee, Schenectady; Lawrence E. Szala, Scotia, both of N.Y.

[73] Assignee: General Electric Company, Schenectady, N.Y.

[21] Appl. No.: 217,271

[22] Filed: Dec. 17, 1980

[51] Int. Cl.³ .......................... B32B 9/00; B24D 3/02; C22C 1/04; B32B 9/04
[52] U.S. Cl. ...................................... 428/408; 51/307; 51/309; 75/200; 75/201; 75/204; 75/214; 75/226; 264/60; 264/65; 264/271.1; 264/299; 264/332; 428/145; 428/446; 428/698
[58] Field of Search .............. 428/408, 446, 698, 145; 264/60, 65, 271.1, 299, 332; 51/307, 308, 309; 75/200, 201, 214, 226, 204

[56] References Cited

U.S. PATENT DOCUMENTS

| | | | |
|---|---|---|---|
| 4,120,731 | 10/1978 | Hillis et al. | 264/271 |
| 4,141,948 | 2/1979 | Laskow et al. | 264/101 |
| 4,167,399 | 9/1979 | Lee et al. | 51/309 |
| 4,168,957 | 9/1979 | Lee et al. | 51/309 |
| 4,173,614 | 11/1979 | Lee et al. | 264/332 |
| 4,220,455 | 9/1980 | St. Pierre et al. | 51/299 |
| 4,241,135 | 12/1980 | Lee et al. | 428/332 |

*Primary Examiner*—William R. Dixon, Jr.
*Attorney, Agent, or Firm*—Leo I. MaLossi; James C. Davis, Jr.

[57] ABSTRACT

A process for simultaneously cementing diamond fines together and bonding the cemented diamonds to a silicon-silicon carbide composite is described. During the process the silicon-silicon-carbide composite furnishes silicon for the cementing and bonding function and the silicon-silicon carbide composite provides for the structural stability of the resulting article. The process comprises placing a quantity of diamond powder and a mass of silicon-silicon carbide composite adjacent to each other, packing such material to form a stabilized geometry, heating the stabilized geometry in an inert atmosphere, and simultaneously applying pressure thereto.

15 Claims, 5 Drawing Figures

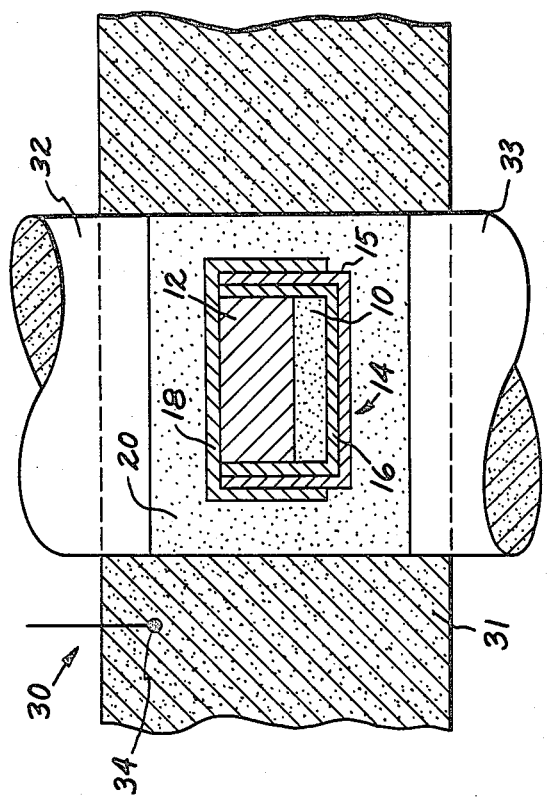
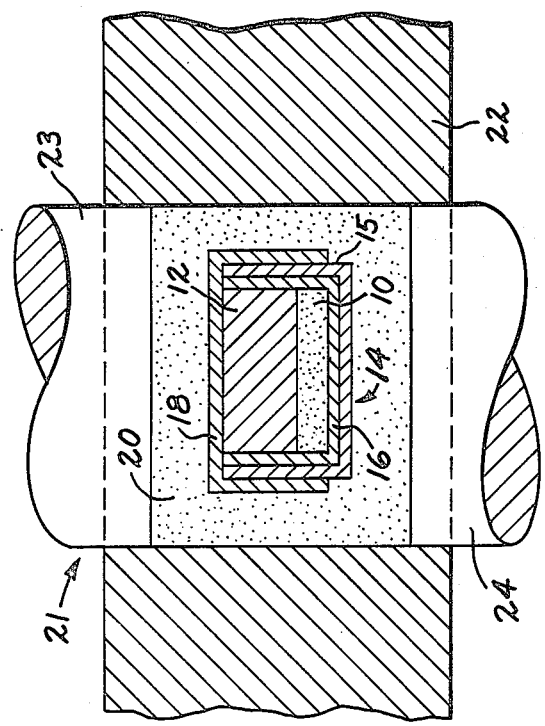
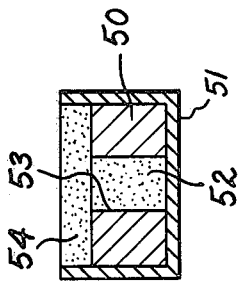
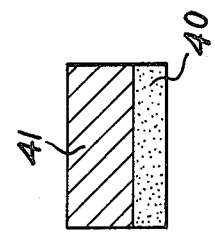

PROCESS FOR CEMENTING DIAMOND TO SILICON-SILICON CARBIDE COMPOSITE AND ARTICLE PRODUCED THEREBY

BACKGROUND OF THE INVENTION

1. Field of the Invention

This invention relates to the production of an article comprising a cemented diamond mass bonded to a body of silicon-silicon carbide composite material. Heretofore, processes for the preparation of a cemented diamond mass bonded to a high strength substrate such as silicon nitride (U.S. Pat. No. 4,173,614—Lee et al.) or silicon carbide (U.S. Pat. No. 4,241,135—Lee et al.) utilizing pressures below the pressure of the diamond stable region have required, in addition to the diamond fines, both a body of the high strength substrate material and a separate source of binder material (i.e., eutectiferous silicon-rich alloy) for infiltration through the interstices between the diamond fines. The above-noted patents are incorporated by reference.

2. Summary of the Invention

In accordance with the inventive concept disclosed herein, an integrated article comprising cemented diamond fines bonded to a body of silicon-silicon carbide is produced by a process in which a body of silicon-silicon carbide composite is relied upon both as a source of silicon and to provide for the structural stability of the resulting article. More particularly, it has been discovered that by employing a silicon-silicon carbide composite body as the structural substrate for, or as high strength containment for, the cemented diamond fines, silicon can be squeezed out of the composite by subjecting it to sufficient pressure while it is heated above the melting point of silicon. Silicon-silicon carbide composites suitable for the practice of this invention include, by way of example, those made by the infiltration of a confined carbon fiber preform with molten silicon metal (U.S. Pat. No. 4,141,948—Laskow et al.) and similar infiltration products in which particulate inorganic materials substantially unreactive to molten silicon (e.g., boron nitride particles) are also present (U.S. Pat. No. 4,120,731—Hillig et al.). The Laskow et al. and Hillig et al. patents are incorporated by reference. The process of the inventive concept disclosed herein is carried out by providing a quantity of diamond powder adjacent to a silicon-silicon carbide composite in a stabilized geometry in a container and subjecting this stabilized geometry to the simultaneous application of a pressure of a few thousand pounds per square inch and heat to a temperature above 1500° C. in an inert atmosphere.

Objects and the nature and advantages of the instant invention will be apparent to those skilled in the art from the description set forth herein and the accompanying drawings.

BRIEF DESCRIPTION OF THE DRAWINGS

The present invention will be readily and clearly understood by those skilled in the art upon reviewing the accompanying drawings in which:

FIG. 1 is a vertical sectional view showing an arrangement for containing and applying substantially isostatic pressure to the properly positioned constituents to be consolidated;

FIG. 2 is a view similar to FIG. 1 with the pressure-transmitting medium, containment and constituents in a stabilized geometry transferred to a graphite pressure die for the simultaneous application of heat and pressure thereto;

FIG. 3 is a vertical view through the article produced from the constituents disposed as shown in FIGS. 1 and 2;

FIG. 4 is a vertical section through a different arrangement for enclosing constituents for producing the stabilized geometry of an alternative form of the disclosed invention; and FIG. 5 is a vertical section through the article produced from the stabilized geometry illustrated in FIG. 4.

DETAILED DESCRIPTION OF THE INVENTION

Referring now more particularly to the drawings and the following description, the reader may envision in FIGS. 1, 2 and 4 the disclosed process for simultaneously cementing diamond fines together and bonding the cemented mass to a silicon-silicon carbide (Si-SiC) composite without the need of a separate source of silicon atoms to accomplish the cementing and bonding. Variations of the article obtainable from the disclosed process are illustrated by way of example in FIGS. 3 and 5.

Thus, it may be understood from FIG. 4 or from FIGS. 1 and 2 that the disclosed process for cementing or bonding diamond to a silicon-silicon carbide composite comprising the steps of placing a quantity of diamond fines 10 and a silicon-silicon carbide (Si-SiC) composite 12 adjacent to each other in a receptacle 14 as components in the desired article and subjecting these components and the containment means therefor to a pressure of a few thousand pounds per square inch and a temperature above 1500° C. to cause molten silicon from the Si-SiC composite 12 to infiltrate the diamond powder 10 to cement or bond together the particles of diamond and at the same time bond the cemented diamond to the Si-SiC composite 12. Under the foregoing conditions, molten silicon will be squeezed from the Si-SiC composite to infiltrate the diamond powder through the interstices thereof to render the diamond powder 10 a consolidated mass and to integrate this mass with the Si-SiC composite 12 along an interface consisting essentially of silicon carbide and silicon. In addition the interface may contain small quantities of the metal containment means and/or silicides of such metal(s). These latter should have no detrimental effect on the interface, but are not relied upon for bonding.

In the embodiment of the disclosed invention as illustrated in FIGS. 1, 2 and 3, a quantity 10 of diamond powder is placed as a layer adjacent a Si-SiC composite body 12 in a metal receptacle 14 consisting of two interfitting cups, a refractory metal cup for containment (e.g., molybdenum cup 15) and lining 16 therefor of a metal (e.g., zirconium) having gettering capabilities. It is to be understood from FIG. 1 that receptacle 14 is first partially filled with a layer of diamond powder 10 after which the Si-SiC disc 12 is placed on top of diamond powder 10.

After the Si-SiC composite disc 12 has been placed on top of the diamond powder 10, initial containment is completed with cup 18 (e.g., of molybdenum). This assembly is embedded in mass 20 of very fine particles, preferably in the size range from about 2 microns to about 20 microns, of a pressure transmitting powder medium, preferably hexagonal boron nitride, in pressure mold 21 (ring 22 and pistons 23, 24), preferably of tool steel. Cold pressing of the contents of the die is accomplished utilizing pressures greater than about 20,000 psi, preferably about 50,000 psi, to produce a stabilized geometry of the contents.

Having stabilized the geometry, the consolidated contents of die 21 is transferred as a packed mass from the steel die 21 to an identical diameter graphite mold 30 (ring 31 and pistons 32, 33) in which the consolidated assembly is simultaneously subjected (in a suitable furnace) to a pressure of about 10,000 pounds per square inch and temperature of 1530° C. for about one minute to melt the silicon metal content of the Si-SiC body 12 and squeeze molten silicon from the Si-SiC composite 12 to infiltrate the interstices of the diamond powder 10. This heating-pressurizing step is conducted in an atmosphere of nitrogen, hydrogen or inert gas. Contact between the diamond particles and the molten silicon produces silicon carbide around the individual particles. In larger interstices there may remain some unreacted silicon metal. The result is a cemented dense polycrystalline diamond layer 40 bonded to a densified Si-SiC substrate 41 as illustrated in FIG. 3. As noted hereinabove, the interface between diamond layer 40 and Si-SiC substrate 41 will consist essentially of silicon carbide and silicon. The article of FIG. 3 is useful as a cutting tool insert.

Hexagonal boron nitride densified around the assembly in the cold press step not only isolates the assembly from the graphite mold (FIG. 2), but also functions as the ultimate container for the assembly. Thus, if the molten silicon leaving the Si-SiC attacks the metal containment and breaches it, the molten silicon is contained by the dense boron nitride.

Si-SiC material is available with silicon content ranging from about 30 to 60 volume %. After the step of heating under pressure, the silicon content can be reduced to about 15 volume % (the Si-SiC being densified in the process). Thus, the desired amount of molten silicon can be made available by selecting a Si-SiC composite body at the start having appropriate volume and silicon content. If the body of Si-SiC to be used contains somewhat less than the desired available silicon to provide the cementing and bonding function, it can, of course, be supplemented with a separate silicon atom source. The operating temperature must, of course, be significantly in excess of the melting point of all silicon atom sources in the assembly. A metal disc to provide such supplemental silicon atoms could, for example, be located on either side of the layer 10 in the assembly arrangement in FIGS. 1 and 2.

The temperature of the graphite die is monitored by means of thermocouple 34.

In the alternate assembly embodiment illustrated in FIG. 4, annularly-shaped Si-SiC composite 50 is disposed in refractory metal cup 51. Diamond powder 52 is placed adjacent to the inner surface of Si-SiC composite 50 filling the cylindrical cavity 53 and covered with disc 54 (e.g., a disc of hot pressed hexagonal boron nitride) to complete the containment. The structure shown in FIG. 4 produced from the quantity 52 of diamond powder and the Si-SiC composite 50 is subjected to cold pressing, as for example, in the apparatus of FIG. 1 to produce a stabilized (i.e., consolidated) geometry. After consolidation, the assembly and pressure transmitting medium are then transferred to graphite die 30 for about one minute at a pressure of about 10,000 pounds per square inch and a temperature of 1530° C. (i.e., a temperature significantly in excess of the melting point of silicon at the prevailing pressure). The resulting article is useful as a blank for the preparation of a wire-drawing die. The short period of time employed for the hot pressing step (e.g., about one minute) minimizes the risk of graphitization of the diamond.

The apparatus disclosed is exemplary and other apparatus able to carry out the requisite functions may be employed in the process of this invention.

Favorable results have been obtained in the following examples of the present invention where mixtures of diamond powder of grades designated as Grade 1 and Grade 2 were used. Grade 1 diamond powder includes particle sizes ranging from about 0 to 60 microns while Grade 2 diamond powder includes particle sizes ranging from about 2 to 4 microns. More specifically, for Grade 1 diamond powder, a typical sample has particle size content in terms of percent by weight as follows:

| Size in Microns ($\mu$) | Percent by Weight |
| --- | --- |
| 45 < 60 | 0 to 5% |
| 30 to 45 | 24 to 31 |
| 20 to 30 | 25 to 35 |
| 10 to 20 | 20 to 30 |
| 10 > | 0 to 10 |

Various blends of diamond powder have been used successfully in carrying out the present invention including blends having 70% by weight of Grade 1 and 30% by weight of Grade 2. Such a blend will contain particle sizes ranging approximately from 1 micron to 60 microns with at least 40% by weight being smaller than 10 microns in size.

The following examples are exemplary of the practice of this invention:

EXAMPLE 1

(a) 230 mg. of the above blend of fine diamond powder was distributed in a layer on the bottom of a molybdenum cup 0.002" thick and 0.350" internal diameter and having a 0.002" thick zirconium liner;

(b) A Si(30%)-SiC composite disc (0.125" thick and 0.347" in diameter) was press-fit into the liner on top of the diamond powder and covered with a disc of hot-pressed hexagonal boron nitride;

(c) The assembly defined in (a) and (b) was buried in hexagonal boron nitride powder in the steel die of FIG. 1 and cold pressed at about 50,000 pis; and (d) The consolidated assembly and surrounding hexagonal boron nitride was transferred from the steel die to a graphite die of identical diameter and simultaneously subjected to about 10,000 psi of pressure and temperature of 1530° C. for about one minute in a nitrogen atmosphere to produce a well-infiltrated dense cemented polycrystalline diamond layer integral with a densified Si-SiC composite substrate.

EXAMPLE 2

(a) A 0.125" thick Si(40%)-SiC disc (0.349" diameter) with a 0.060" cylindrical diameter hole at the center thereof was press-fit into a zirconium cup (0.002" thick and 0.349" interior diameter);

(b) The center hole of the Si-SiC disc was filled with the above-noted blend of diamond fines and the open end of the cup was covered with another zirconium cup of larger diameter (as in FIG. 1);

(c) The assembly defined in (a) and (b) was embedded in hexagonal boron nitride powder in a steel die as in FIG. 1 and cold pressed at about 50,000 psi; and (d) The consolidated assembly and surrounding hexagonal boron nitride was transferred from the cold pressing apparatus to a graphite die of identical internal diameter and simultaneously subjected to a pressure of about 10,000 psi and a temperature of 1530° C. for about one minute in a nitrogen atmosphere to produce a unified die blank consisting essentially of the Si-SiC composite cylinder surrounding a cemented diamond core well-bonded thereto.

It will be obvious to those skilled in the art that various changes may be made without departing from the scope of the invention as disclosed herein in its best mode and the invention is not to be considered limited to what is shown in the drawings and described in the specification.

What we claim as new and desire to secure by Letters Patent of the United States is:

1. In a process for cementing diamond particles together and bonding the cemented diamond particles to a substrate wherein an assembly comprising a volume of said diamond particles, said substrate, a silicon atom-yielding medium as the source of silicon atoms and containment means therefor is provided in a stabilized geometry and said assembly of stabilized geometry is hot-pressed at a temperature in excess of the melting point of said silicon atom-yielding medium and at a pressure sufficiently high to cause molten silicon atom-yielding medium to infiltrate the interstices between said diamond particles, said temperature and pressure simultaneously employed for the hot pressing having values below the diamond stable region of the phase diagram of carbon, the improvement comprising:
   (a) employing a body of silicon-silicon carbide composite both as the substrate and as the primary source of silicon atoms to accomplish the cementing and bonding required and
   (b) heating above about 1500° C.

2. The improvement as defined in claim 1, wherein the diamond particles are placed in the assembly as a layer adjacent the silicon-silicon carbide composite body.

3. The improvement as defined in claim 1, wherein in the assembly the silicon-silicon carbide composite body is in the form of a hollow cylinder and the diamond particles are disposed in the cavity in said body.

4. The improvement as defined in claim 1, wherein the hot pressing employs a temperature above 1500° C. and a pressure of about 10,000 pounds per square inch pressure for about one minute.

5. The process as defined in claim 4, wherein the temperature reaches a value of 1530° C.

6. The improvement as defined in claim 1, wherein the silicon-silicon carbide composite body is the sole source of silicon atoms.

7. The improvement as defined in claim 1 wherein the diamond particles contain particle sizes ranging from about 1 micron to 60 microns with at least 40% by weight of the particles being smaller than 10 microns in size.

8. A process for cementing diamond particles together and bonding the cemented diamonds to a silicon-silicon carbide composite comprising the steps of:
   (a) introducing a quantity of diamond fines into a refractory metal cup in a layer of generally uniform depth;
   (b) placing a cylindrical silicon-silicon carbide composite disc on top of said diamond fines;
   (c) closing the top of said metal cup to complete containment of said diamond fines and composite disc to form an assembly;
   (d) subjecting said assembly to pressure to provide the assembly in a stabilized geometry; and
   (e) raising the temperature of said assembly as stabilized to about 1530° C. in a nitrogen atmosphere and simultaneously pressing it for about one minute at a pressure of about 10,000 pounds per square inch to produce a silicon-infiltrated dense polycrystalline diamond layer bonded directly to said silicon-silicon carbide composite disc as substrate therefor.

9. A process for cementing diamond particles together and bonding the cemented diamonds to a silicon-silicon carbide composite comprising the steps of:
   (a) placing a silicon-silicon carbide composite disc having a hole therein in a refractory metal cup;
   (b) filling said hole with diamond powder;
   (c) covering said cup at its open end to complete containment of said composite disc and diamond fines to form an assembly;
   (d) subjecting said assembly to pressure to provide the assembly in a stabilized geometry, and
   (e) raising the temperature of said assembly as stabilized to about 1530° C. in a nitrogen atmosphere and simultaneously pressing it for about one minute at a pressure of about 10,000 pounds per square inch to produce a silicon-infiltrated diamond core bonded directly to the surrounding silicon-silicon carbide material.

10. The article produced by the process of claim 1.

11. The article produced by the process of claim 8.

12. The article produced by the process of claim 9.

13. An article of manufacture comprising a base portion of densified silicon-silicon carbide composite material having silicon content of less than about 15 volume percent and a dense cemented polycrystalline diamond mass, said diamond mass being bonded to said silicon-silicon carbide composite.

14. The article as defined in claim 13, wherein said diamond mass is in the form of layer and said silicon-silicon carbide composite is in the form of a substrate therefor.

15. The article as defined in claim 13, wherein said silicon-silicon carbide composite is in the form of hollow cylinder enclosing a core of cemented diamond bonded to said silicon-silicon carbide composite.

* * * * *